US008605152B2

(12) United States Patent
Mills (10) Patent No.: US 8,605,152 B2
(45) Date of Patent: Dec. 10, 2013

(54) METHOD AND APPARATUS FOR YOGA CLASS IMAGING AND STREAMING

(71) Applicant: Derik Mills, Manhattan Beach, CA (US)

(72) Inventor: Derik Mills, Manhattan Beach, CA (US)

(73) Assignee: YogaGlo, Inc., Santa Monica, CA (US)

( * ) Notice: Subject to any disclaimer, the term of this patent is extended or adjusted under 35 U.S.C. 154(b) by 0 days.

(21) Appl. No.: 13/763,569

(22) Filed: Feb. 8, 2013

(65) Prior Publication Data

US 2013/0128053 A1 May 23, 2013

Related U.S. Application Data

(63) Continuation of application No. 13/220,621, filed on Aug. 29, 2011.

(60) Provisional application No. 61/377,608, filed on Aug. 27, 2010.

(51) Int. Cl.
*H04N 7/18* (2006.01)
(52) U.S. Cl.
CPC .................................. *H04N 7/181* (2013.01)
USPC ........................................................ 348/143
(58) Field of Classification Search
None
See application file for complete search history.

(56) References Cited

U.S. PATENT DOCUMENTS

| 7,567,847 | B2 * | 7/2009 | Basson et al. ............... 700/94 |
| 8,208,002 | B2 * | 6/2012 | Saleh et al. ............ 348/14.08 |
| 8,456,571 | B1 * | 6/2013 | Taylor et al. ............... 348/445 |
| 2002/0051958 | A1 * | 5/2002 | Khalsa ..................... 434/238 |
| 2006/0228692 | A1 * | 10/2006 | Seshadri ................. 434/365 |
| 2007/0219058 | A1 | 9/2007 | Fleishman |
| 2011/0050842 | A1 * | 3/2011 | Saleh et al. ........... 348/14.08 |
| 2011/0224999 | A1 | 9/2011 | Baccarella-Garcia |

FOREIGN PATENT DOCUMENTS

DE 102010017700 A1 1/2012

OTHER PUBLICATIONS

Manela, Dori, "Behind the Scenes at a YogaVibes Core Fusion Filming," Sep. 14, 2010,<http://dorishinyblog.com/2010/09/14/behind-the-scenes-at-a-yogavibes-core-fusion-filming/>.

* cited by examiner

Primary Examiner — Nhon Diep
(74) Attorney, Agent, or Firm — Venable LLP; Stefan J. Kirchanski (57) ABSTRACT

The ability to view and participate in various types of instructional classes, including Yoga, remotely and on-demand has become increasingly popular and accessible. However, participating in instructional classes off-site does not replicate the same experience as participating in an instructional class on-site, live with an instructor. The claimed system and method allow the viewer participant to view and take part in an instructional class from any location and at any time without compromising the viewer's ability to experience a participatory class experience. The system and method place the instructor at the head of the classroom with live-participants arranged between the instructor and the camera with a direct line of sight between the camera and the instructor allowing for the viewer participant to have unobstructed views while simultaneously allowing for the viewer participant to have live participants in the periphery, as if the viewer was attending a live class.

14 Claims, 10 Drawing Sheets

METHOD AND APPARATUS FOR YOGA CLASS IMAGING AND STREAMING

CROSS-REFERENCE TO PRIOR APPLICATIONS

This application is a continuation application and claims benefit and priority of U.S. non-provisional application Ser. No. 13/220,621, filed 29 Aug. 2011, which claims benefit and priority of U.S. Provisional Patent Application No. 61/377,608, filed 27 Aug. 2010, which is incorporated herein by reference to the extent permitted by applicable law.

U.S. GOVERNMENT SUPPORT

Not Applicable

BACKGROUND OF THE INVENTION

1. Area of the Art

The present invention is directed to a method and apparatus for the filming, video editing and mixing, and streaming via the internet of a live yoga class, and, more particularly, to a method and apparatus for the set-up and filming process of a yoga class to transmit from the live on-site yoga class to a viewer participating remotely via a website.

2. Description of the Background of the Invention

Yoga in its many and various forms, has been practiced for thousands of years. As a form of exercise yoga stresses harmony of the body through stretching and strengthening exercises. Today, students generally participate in classes either by in-person attendance or at home by watching a video of the class. By "video" and "filming" is meant technology for recording and disseminating moving images (video) and well as sound (audio) of a class or any other event. Although actual "film" is still in limited use, it is anticipated that within the useful life of the present invention technologies not yet in widespread use will be the normal way of imaging and recording events. Similarly, "videos" (i.e., discs or tapes), "streaming via internet" and "via a website" are intended to encompass present and future technologies whereby captured video is distributed to end users.

One may either attend a class in person or purchase a video in-store or on-line (e.g., pay-per-download). Those classes where students participate via video typically are arranged to show the yoga instructor in the foreground with students attending the class located behind the instructor, such that the person viewing the video is closest to the yoga instructor. The class participants are placed behind the instructor where they mirror the movements of the yoga instructor. Alternatively, some classes may arranged to show the yoga instructor and the students from the side of the classroom. Either way, such filming perspectives inherently provide the impression of viewing a class rather than of being an active participant in the class.

In addition, viewing a class from such perspectives can be detrimental to the participant watching the video because at a subconscious level the participant realizes that he or she is not truly a member of the class and that the exercise routines are being conducted without truly including the participant.

Further, the traditional method of capturing video data on the tape and then processing it from tape through editing through to a final product is a long, laborious and expensive.

SUMMARY OF THE INVENTION

The present invention creates an experience of participating in a real class with real students even though the viewer is not actually present in the class. This is accomplished by the unique setup of the classroom, the position of the yoga instructor and yoga participants and the position of the camera imaging the yoga exercises and stretches. The perspective of the viewer watching the captured image is thus one of an actual participant in the class. The instructor is placed at the head of the studio with the yoga participants arranged between the yoga instructor and the camera. A direct line of sight between the camera and the yoga instructor, a "no mat area," is provided so that there is an unobstructed view of the yoga instructor which allows for a participatory view of the yoga class for the viewer.

The present invention, including its features and advantages, will become more apparent from the following detailed description with reference to the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a method and apparatus for imaging the video and sound editing and mixing, and streaming of the video/sound via the internet of a live yoga class in such a manner that a remote viewer feels included in the class.

Figure 1:
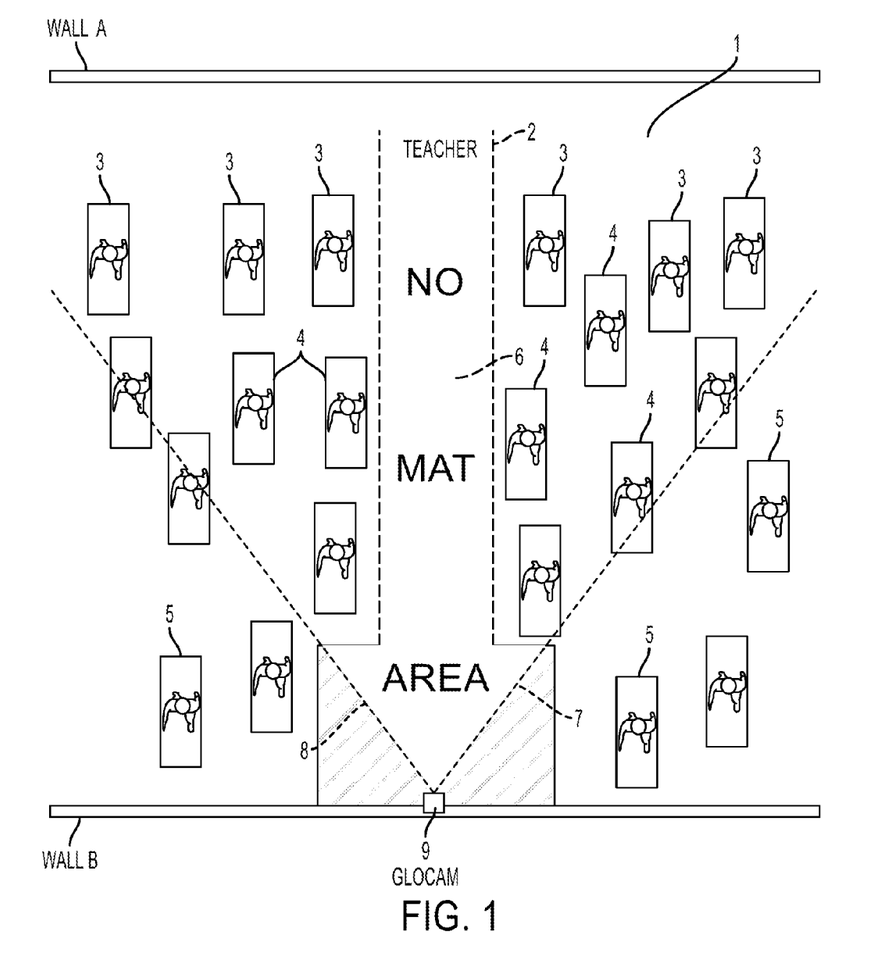
FIG. 1 illustrates a schematic of the placement of the yoga instructor, the yoga class participants and the video camera in a yoga class studio, according to an embodiment of the present invention.

Referring now to FIG. 1, a top perspective view of a yoga class 1 in session is shown. The various combined elements of the perspective of the filming are designed and intended to create an experience for the remote video participant of being embedded in a real class with actual students. The design and construction of the studio itself are specific towards meeting such intent and/or objective.

The studio is a room having a front area (closed by a wall in this example), a rear area (also closed by a wall), and two side walls (generally not shown, here). To begin with, with regard to the construction and preparation of the yoga studio itself, Wall A is preferably a white flat wall roughly 16 feet high. A 16 ft ceiling height allows for an expansive white wall that covers the entire left to right width of the field of view. The floor itself is preferably made of 5" wide white oak wood. If the planks of the wood floor are too thin then the viewing experience is a little too busy and gives a feeling of simply being a gym floor, as opposed to a larger wood panel floor that provides a more substantial feeling of a more sophisticated and welcoming setting. The elements of the studio construction thereby provide a proper atmosphere and ambiance for the yoga video participant.

Further, with regard to the set-up of the yoga class itself, the instructor position at the front of the room contains the instructor's mat. The back edge of the teachers (instructors) yoga mat 2 is preferably approximately two feet from Wall A. The front edge of the yoga mats of the front row of student positions 3 is preferably a minimum of one foot from the front edge of the instructors mat 2; however, some variation is acceptable. The remainder of the student positions (yoga mats) 4 are strategically placed so that the mats are relatively evenly spaced apart and even in distribution around the yoga class area. Such placement helps to create the experience of being in a real class. Additional mats 5 may be placed towards the rear of the studio. The instructors yoga mat 2 is then positioned perpendicular to that of the student's mats 3, 4 and 5. Additionally, a wireless microphone can either be attached to the yoga instructor or placed somewhere nearby, the audio from the microphone being controlled and mixed remotely. Music can be mixed in as well. All of the resulting audio feed then combined with video output of the camera 9 and subsequently recorded.

An image capturing device (camera 9—labeled in FIG. 1 as "GloCam") is mounted at the back of the yoga studio (i.e., Wall B) and may be concealed (e.g., housed inside a white box or other concealing structure). The camera is preferably about 35 inches off the ground and preferably about 40 feet from the instructors mat 2. It should be noted that the camera may be somewhat higher or lower; however, the placement of the camera allows for the participatory view of the yoga class. If the camera is placed too high or too low the resulting perspectives change the look and feel of the viewer's experience. The same holds true for the distance of the camera from the instructor. The preferred embodiments of the height and distance thus allow for the best experience for the viewer of seeming to actually practice yoga with the instructor and other yoga students in a class setting. With respect to the camera itself, it is preferably a high definition camera, for example, a Sony PMW-EX1, f=5.8 to 81.2 mm (equivalent to 31.4 to 439 mm on 35 mm lens), which records its output to an ExpressCard/34 memory device. Additionally, depending on the time of day, the camera can be set to automatically accommodate changes in lighting. Camera wires run from the white plastic box to a remote location and the camera is preferably operated remotely with no film crew inside the class to interfere with the ambience and feeling of a regular yoga studio.

Further, a corridor 6, labeled in FIG. 1 as a "no mat area", runs down the middle of the studio 1. The corridor 6 allows for the unobstructed view of the yoga instructor and the yoga instructor's mat 2. The "no mat area" corridor 6 is preferably about five feet wide starting from the yoga instructors mat 2 through the area of the student's mats 3 and 4 to a point preferably about six feet from the camera 9, at which point corridor 6 widens to preferably about six feet. Corridor 6 which must be at least the minimum of the width of the instructors yoga mat 2, is preferably perpendicular to the center of the instructors mat and centered around that perpendicular line. Accordingly, it is to be understood that corridor 6 down the middle is made large enough such that the yoga class feels to the viewer to be sufficiently attended but not so constrained as to give a claustrophobic look of looking down a small tunnel of vision. Additionally, corridor 6 widens at a point closer to the camera so as to create an additional impression of being in the class with other participants, but not right on top of other participants either. Corridor 6 is left vacant so that the camera 9 can zoom in on the instructor demonstrating on the yoga mat to show the close up details of the instructors demonstration without any class members getting in the way and obstructing the view for the viewer.

Lastly, placement of camera 9 at a distance from the instructors mat 2 creates an angle of "widest" viewing. Such wide angle is shown by dotted lines 7 and 8, each line basically running at 45 degrees from the perpendicular line between the camera 9 and the yoga instructors mat 2 and going off to each side of the yoga studio. Lines 7 and 8 essentially show what camera 9 can view at the widest lens angle.

It will be appreciated that while the most common application of the present invention is within an actual yoga studio classroom as described above, the application is also applicable to a studio (stage) setting where the classroom appearance is replicated. In that case, the front wall (Wall A) could merely be a partition towards the back of the stage. The camera 9 is placed the requisite distance from the "front" of the classroom with the students arranged between the "front" and the camera 9. Other details (such as camera height) remain the same.

Figure 2:
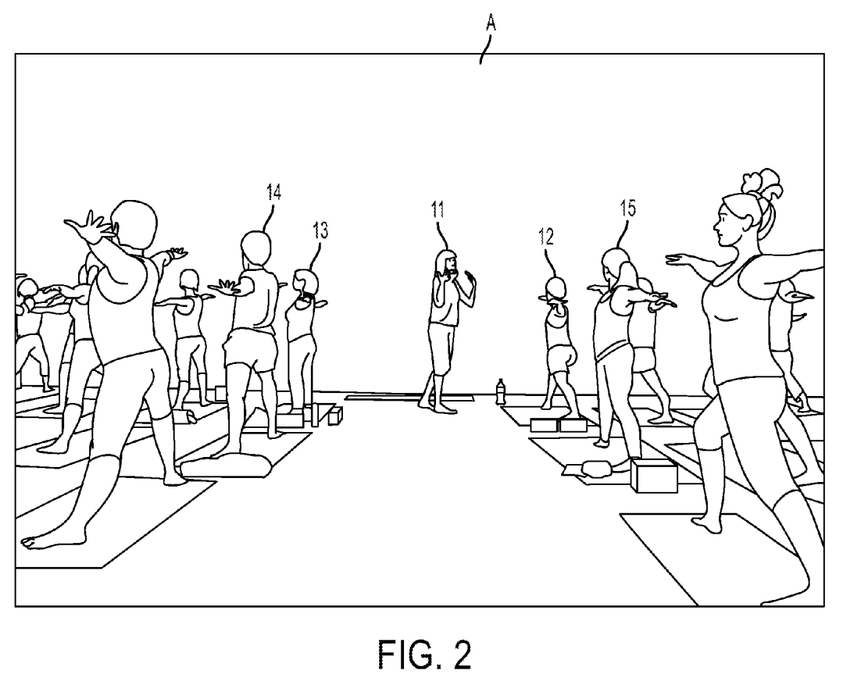
FIG. 2 is an illustration of an actual yoga class led by a yoga instructor and attended by yoga participants allowing for a direct line of sight from the camera positioned at the back of the class to the yoga instructor positioned at the front of the class, according to an embodiment of the present invention.

Referring now to FIG. 2, a yoga class is illustrated led by a yoga instructor 11 and attended by yoga participants 12, 13, 14, 15, etc. The students are facing Wall A and the instructor 11 so that a filming perspective is from the back of the yoga class with the students' backs facing the camera (not shown). The illustration is basically taken from the camera eye and therefore the viewers eye is positioned as the person at the back of the class in the center with a direct view to the instructor 11. As shown, this then allows a direct line of sight from the camera positioned at the back of the class to the yoga instructor positioned at the front of the class. The viewer thus has the direct line of sight from the camera to the yoga instructor with a periphery of other participants so as to create participatory feel.

Figure 3A:
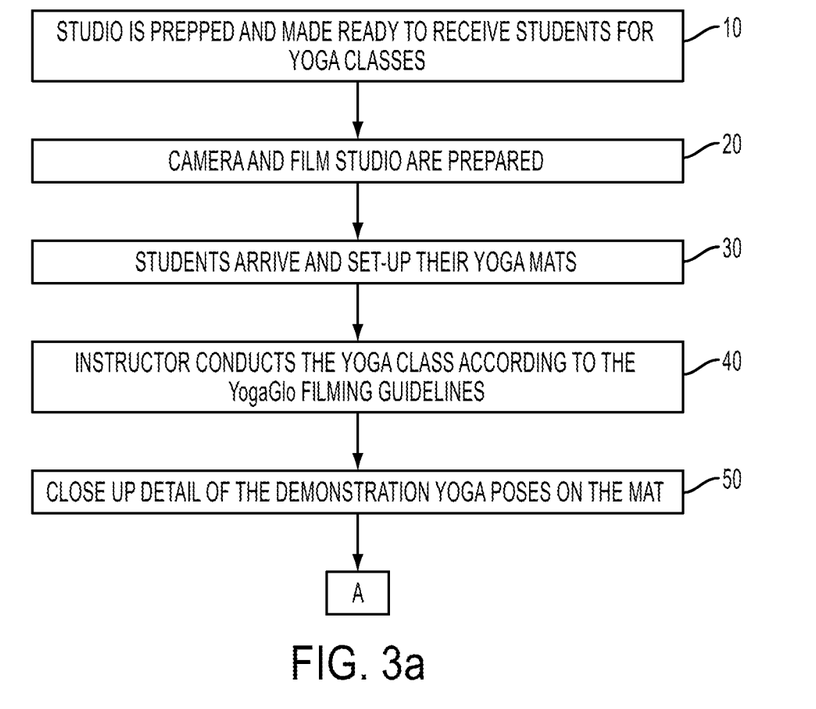
FIGS. 3a and b shows a flow diagram (divided into two portions, FIG. 3a and FIG. 3b, for convenience of illustration) of the process of the set-up and imaging of a yoga class to transmit from the live on-site yoga class to a student participating remotely via a website, according to an embodiment of the present invention.
Figure 3B:
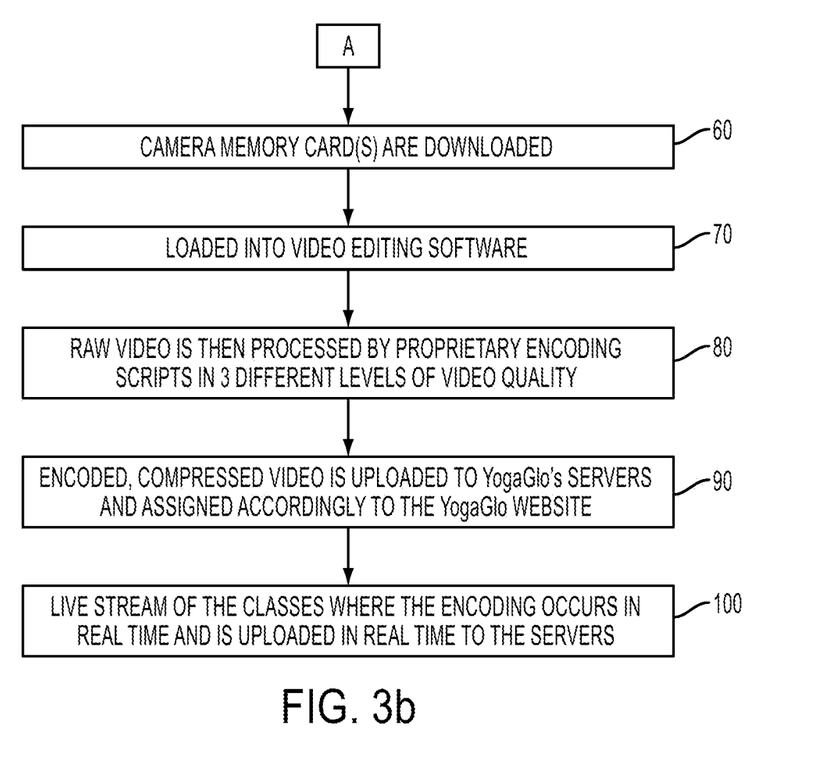
Figure 4:
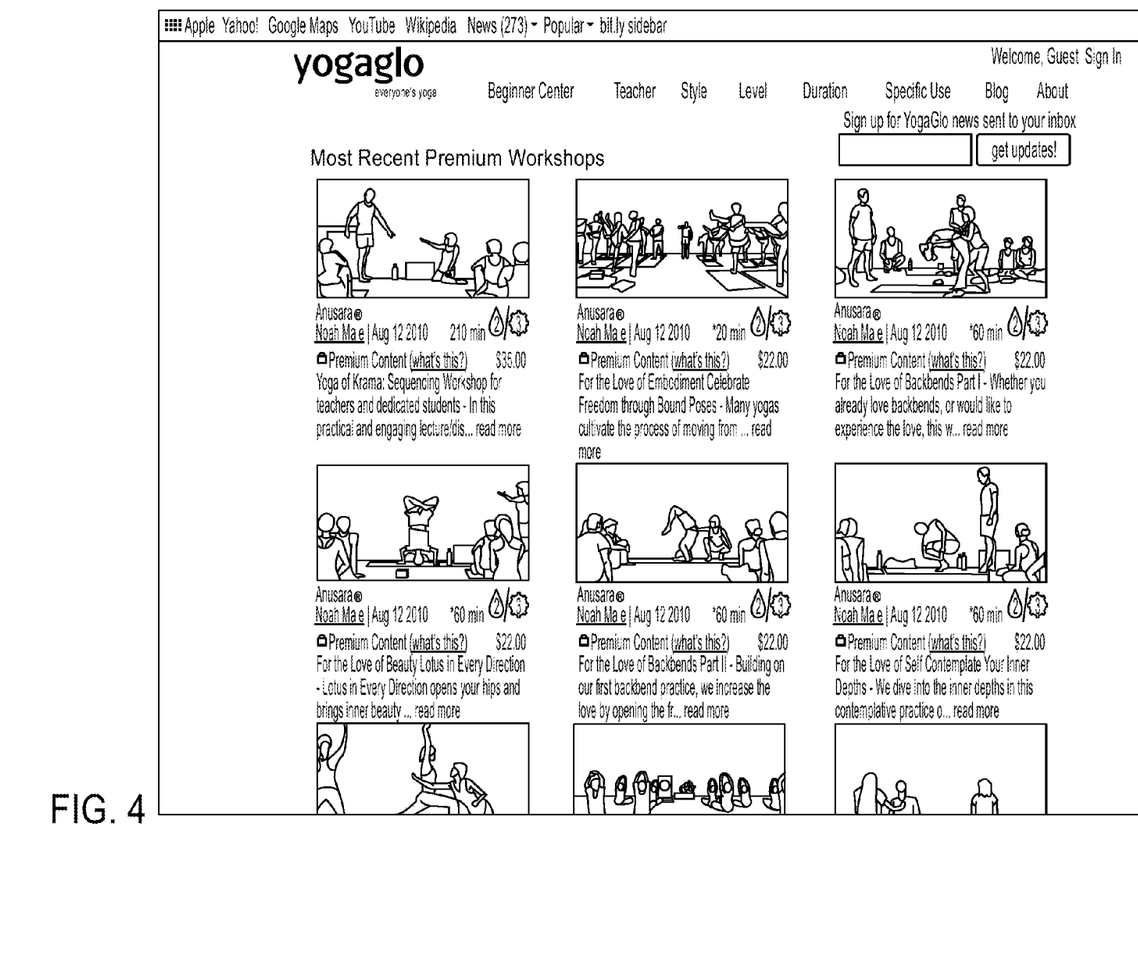
FIG. 4 shows a first screen shot from a website, showing various yoga classes and workshops which may be enjoyed by a participant, according to an embodiment of the present invention.
Figure 5:
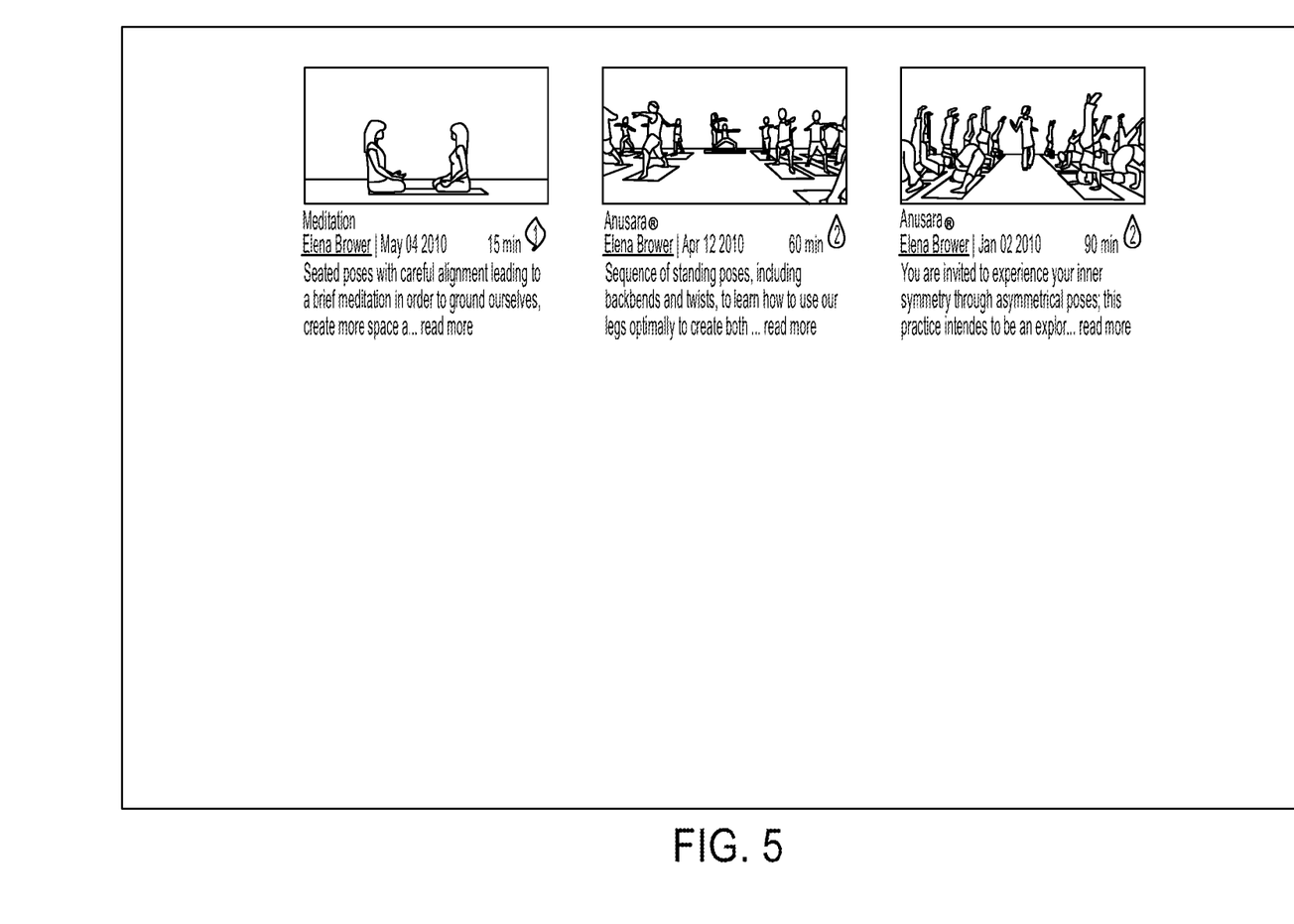
FIG. 5 shows a second screen shot from a website, showing various yoga classes and workshops which may be enjoyed by a participant, according to an embodiment of the present invention.
Figure 6:
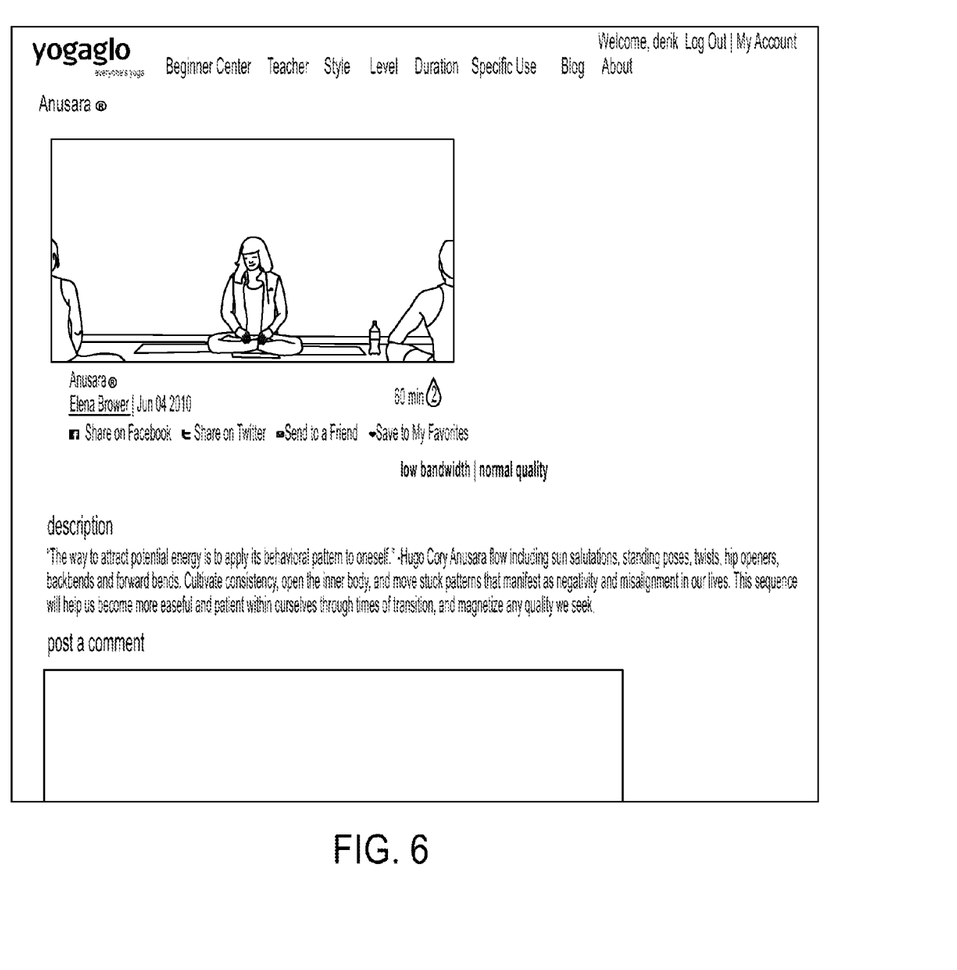
FIG. 6 shows a third screen shot from a website, showing various yoga classes and workshops which may be enjoyed by a participant, according to an embodiment of the present invention.
Figure 7:
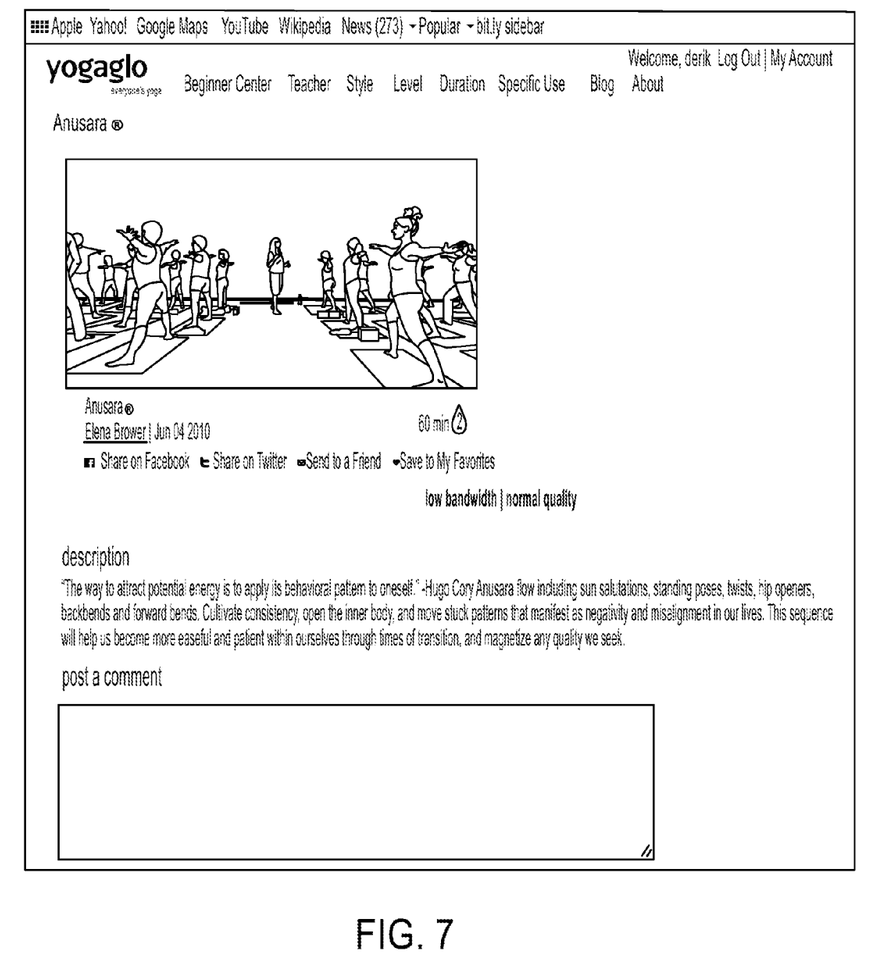
FIG. 7 shows a fourth screen shot from a website, showing various yoga classes and workshops which may be enjoyed by a participant, according to an embodiment of the present invention.
Figure 8:
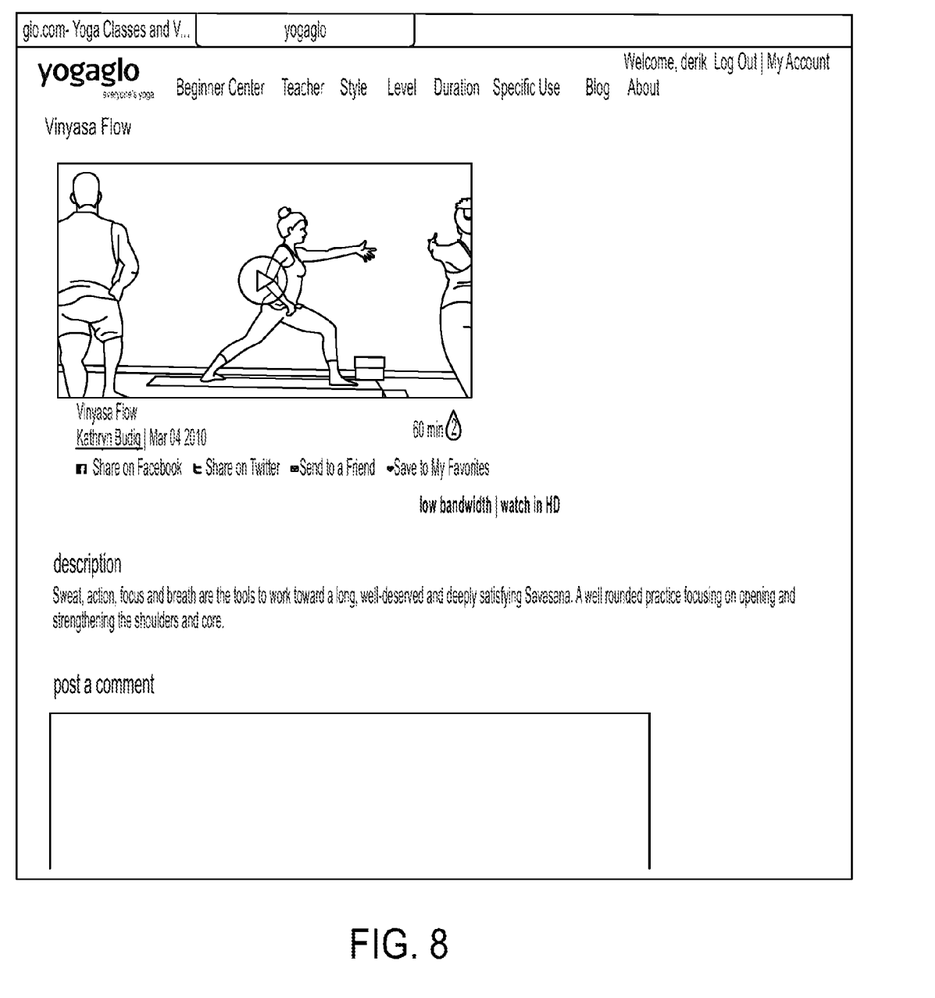
FIG. 8 shows a fifth screen shot from a website, showing various yoga classes and workshops which may be enjoyed by a participant, according to an embodiment of the present invention.
Figure 9:
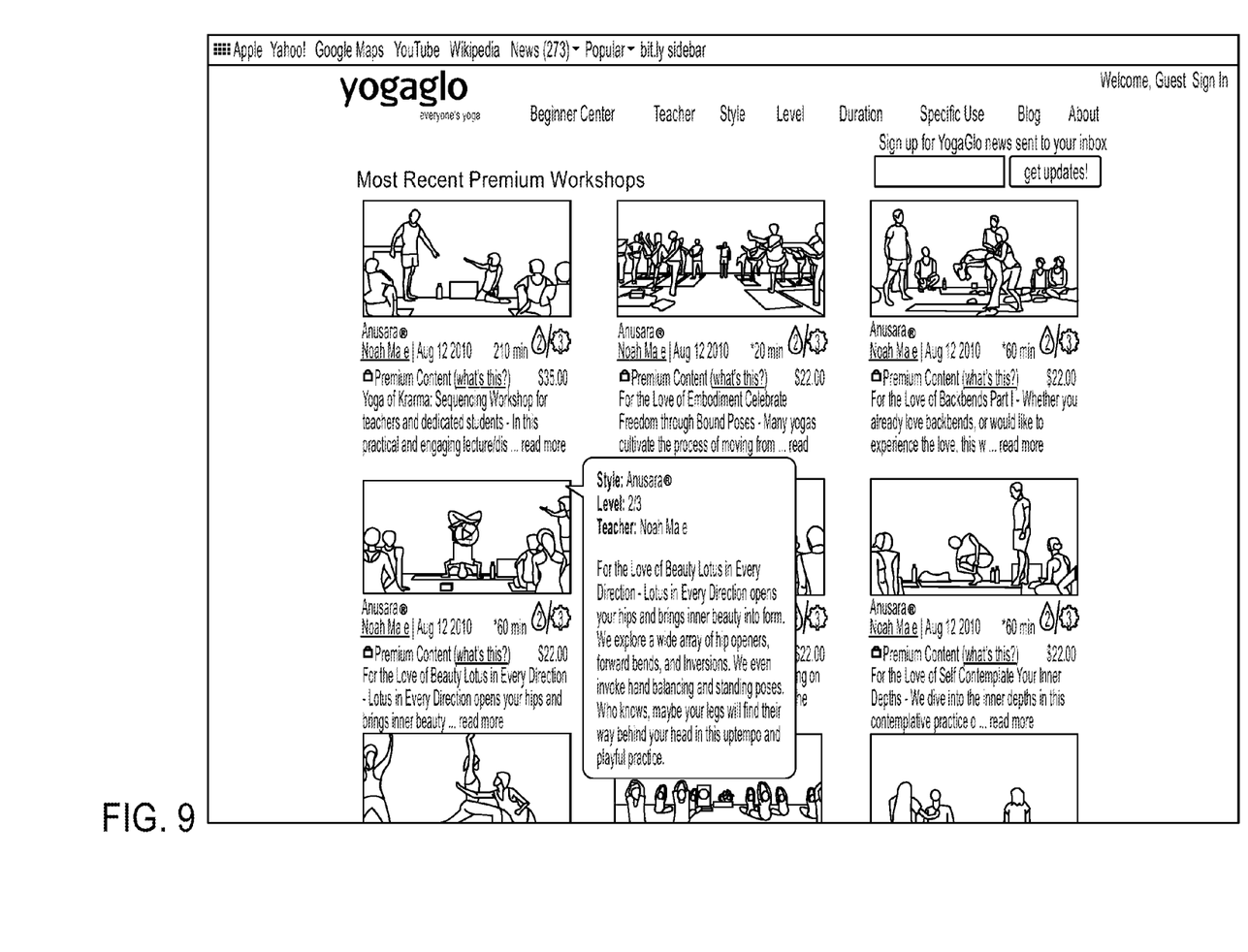
FIG. 9 shows a sixth screen shot from a website, showing various yoga classes and workshops which may be enjoyed by a participant, according to an embodiment of the present invention.

Referring now to FIGS. 3a and 3b, the method of imaging and streaming a video of the yoga class is shown. First, in step 10, the yoga studio is prepped and made ready to receive students for yoga class before the students arrive. This step includes housing the camera inside a box, preferably a white plastic box, and the camera is set to a fixed height from the floor and made stationary. The floor is marked with tape to designate the "no mat area". The instructors mat is placed in position, and the instructor is fitted with a wireless microphone.

In step 20, the camera operator stands by in a remote location ready to operate the camera by means of remote zoom controls and a video monitor. A wireless microphone receiver inside the remote location feeds into an audio mixing board which then feeds back into the camera or other recording device. When music is used in the class, the music playing in the studio is mixed live with the voice audio from a wireless microphone, audio levels are adjusted and then fed into the recording device as a single voice/music audio feed. Of course, it is not necessary to record the audio/video stream which can be distributed directly to remote participants as a live performance.

In step 30, the Students arrive at the studio and lay down their mats in preparation for the class the same as they would in any other yoga studio, except that they may not place their mats within the "no mat area" corridor marked off with tape.

In step 40, while the yoga class is being imaged, the instructor conducts the class according to the YogaGlo filming guidelines developed/iterated over time and via trial and error and user feedback to engage the student at home, to create the experience of being in a real class with actual students.

In step 50, while teaching the yoga class, the instructor will occasionally demonstrate poses on the yoga mat. When this occurs the camera operator will zoom in on the teacher to fill the camera frame to show the close up detail of the demonstration.

In step 60, after the yoga class is finished, the camera memory card(s) are downloaded onto a computer.

In step 70, the video of the yoga class is loaded into off the shelf video editing software for minor adjustments and to add a YogaGlo beginning title page, then exported in raw format.

In step 80, the raw video is then processed by proprietary encoding scripts in 3 different levels of video quality—HD, middle resolution, low resolution. The encoding scripts are written to maximize video compression while maximizing video quality.

In step 90, the encoded, compressed video is uploaded to YogaGlo's servers and assigned accordingly to the YogaGlo website.

In step 100, in live stream of the classes, the same process is used except that the encoding occurs in real time and is uploaded in real time to the servers.

Referring now to FIGS. 4 through 9, screen shots from a website, showing various yoga classes and workshops which may be taken by a participant, are shown. The web site has high quality yoga instruction content that is constantly refreshed. Thus web viewers don't have to buy just one class and do that same class over and over again, instead they can subscribe to the web site and have an exhaustive range of teachers, styles, levels durations and special content for special use that is constantly refreshed and available 24/7 where ever they are.

In the forgoing description, the method and apparatus of the present invention have been described with reference to specific examples or embodiments. It is to be understood and expected that variations in the principles of the method and apparatus herein described may be made by one skilled in the art and it is intended that such modifications, changes and substitutions are to be included within the scope of the present invention as set forth in the appended claims. The Specification and the drawings are accordingly to be regarded in an illustrative rather than in a restrictive sense.

The following claims are thus to be understood to include what is specifically illustrated and described above, what is conceptually equivalent, what can be obviously substituted. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. A system for automatically producing a video representation of a yoga class configured so a remote viewer enjoys the experience of being in a real yoga class, the system comprising:
   a studio having a front area and a rear area;
   an instructor position located in the front area and facing the rear area;
   a line of sight corridor disposed between the rear area and the instructor;
   a plurality of students at student positions, facing the instructor position, distributed across the studio between the instructor position and the image capturing device wherein the student positions do not impinge upon the corridor;
   an image capturing device for capturing video located in the rear area disposed to provide a participatory view from a height of about three feet by capturing through the line of sight corridor, an unobstructed video of the instructor in the instructor position including images of the students disposed along the sides of the line of sight corridor; and
   sound capture equipment to capture at least audio of the instructions given by the instructor disposed in the instructor position to the students disposed in the student positions.

2. The system according to claim 1, further comprising remote control systems whereby the image capture device pans and zooms.

3. The system according to claim 1, further comprising means for recording the video.

4. The system according to claim 1, further comprising means for streaming the video via the Internet.

5. The system according to claim 1, further comprising means for adding music to the audio.

6. The system according to claim 1, wherein the instructor position includes an instructor's mat and each student position includes a student mat with each student mat disposed normal to the instructor's mat.

7. The system according to claim 1, wherein the corridor becomes wider near the image capture device.

8. A method for automatically producing a video representation of a yoga class configured so a remote viewer enjoys the experience of being in a real yoga class, comprising the steps of:
   providing a studio having a front area and a rear area;
   placing an instructor position at the front area of the studio, the instructor position disposed to face the rear area;
   locating an image capturing device for capturing video in the rear area at a height of about three feet to allow for a participatory view disposed to provide a participatory view from a height of about three feet by capturing an image of the instructor in the instructor position;
   laying out a line of sight corridor between the image capturing device and the instructor;
   distributing a plurality of student positions, facing the instructor position, across the studio between the instructor position and the image capturing device wherein the student positions are distributed so as not to impinge upon the corridor;

capturing at least audio of the instructions given by the instructor disposed in the instructor position; and capturing a video of the instructor through the line of sight corridor, which video includes images of the students disposed along the sides of the line of sight corridor.

9. The method according to claim 8, further comprising a step of remotely controlling the image capture device.

10. The method according to claim 8, further comprising the step of recording the video.

11. The method according to claim 8, further comprising the step of streaming the video via the Internet.

12. The method according to claim 8, further comprising the step of adding music to the audio.

13. The method according to claim 8, further comprising a step of placing an instructor's mat in the instructor position and a student mat in each student position with each student mat disposed normal to the instructor's mat.

14. The method according to claim 8, further comprising a step of increasing the width of the corridor near the image capture device.

* * * * *